(12) United States Patent
Pacheco

(10) Patent No.: US 11,945,590 B1
(45) Date of Patent: Apr. 2, 2024

(54) AIRCRAFT SEAT WITH ENERGY ATTENUATING METERING PLATE

(71) Applicant: AMI Industries, Inc., Colorado Springs, CO (US)

(72) Inventor: Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/940,873

(22) Filed: Sep. 8, 2022

(51) Int. Cl.
*B64D 11/06* (2006.01)
*B64D 25/04* (2006.01)

(52) U.S. Cl.
CPC ...... *B64D 11/0619* (2014.12); *B64D 11/0698* (2014.12); *B64D 25/04* (2013.01)

(58) Field of Classification Search
CPC ............ B64D 11/0619; B64D 11/0689; B64D 11/0691; B64D 11/0698; B64D 25/04
See application file for complete search history.

(56) References Cited

U.S. PATENT DOCUMENTS

| | | | |
|---|---|---|---|
| 2,945,654 A * | 7/1960 | Woodward | B64D 11/0689 244/122 A |
| 3,985,388 A | 10/1976 | Hogan | |
| 4,004,763 A * | 1/1977 | Bunnell, III | B64D 11/0689 244/122 AG |
| 4,523,730 A | 6/1985 | Martin | |
| 4,525,010 A * | 6/1985 | Trickey | B64D 25/04 297/308 |
| 5,791,597 A * | 8/1998 | Knoll | B64D 25/04 297/216.17 |
| 6,378,939 B1 * | 4/2002 | Knoll | B64D 11/0619 188/374 |
| 8,408,643 B2 | 4/2013 | Honnorat | |

(Continued)

FOREIGN PATENT DOCUMENTS

| | | |
|---|---|---|
| CN | 113602504 A | 11/2021 |
| EP | 2671800 B1 | 4/2017 |
| GB | 860841 A | 2/1961 |

OTHER PUBLICATIONS

Extended European Search Report dated Dec. 19, 2023; European Application No. 23191116.5.

(Continued)

*Primary Examiner* — Brady W Frazier
*Assistant Examiner* — Shanna Danielle Glover
(74) *Attorney, Agent, or Firm* — Suiter Swantz pc llo

(57) ABSTRACT

A seat base assembly for an aircraft seat includes parallel rails attached to an aircraft bulkhead, each rail including a slot extending vertically within the rail. The seat (e.g., seatback and seat frame) is attached to a sled capable of vertical translation relative to the bulkhead via slidable members that translate along the slots. The sled includes a hole for accommodating a locking pin controllable by the seat occupant. A metering plate attached to the seat base behind the sled is folded over a lateral axis into a forward and rear layer, the forward layer including holes for the locking pin wherein each hole corresponds to a desired seat height to which the seat may be adjusted by securing the locking pin through the sled hole and metering hole. In response to an impact event, the metering plate deforms to absorb impact energy and control downward deceleration of the seat.

9 Claims, 5 Drawing Sheets

(56) References Cited

U.S. PATENT DOCUMENTS

| | | |
|---|---|---|
| 8,550,224 B2 | 10/2013 | Bauer |
| 9,604,725 B2 | 3/2017 | Cecinas et al. |
| 10,052,984 B1* | 8/2018 | Bosen ................ B60N 2/42736 |
| 2003/0052229 A1* | 3/2003 | Mort ...................... B64D 11/06 |
| | | 244/122 R |
| 2013/0229038 A1 | 9/2013 | Marshall |
| 2015/0145295 A1* | 5/2015 | Cecinas ............. B60N 2/42718 |
| | | 297/325 |
| 2019/0118680 A1* | 4/2019 | Sagebiel ............. B60N 2/4279 |

OTHER PUBLICATIONS

Extended European Search Report dated Jan. 17, 2024; European Application No. 23195098.1.

\* cited by examiner

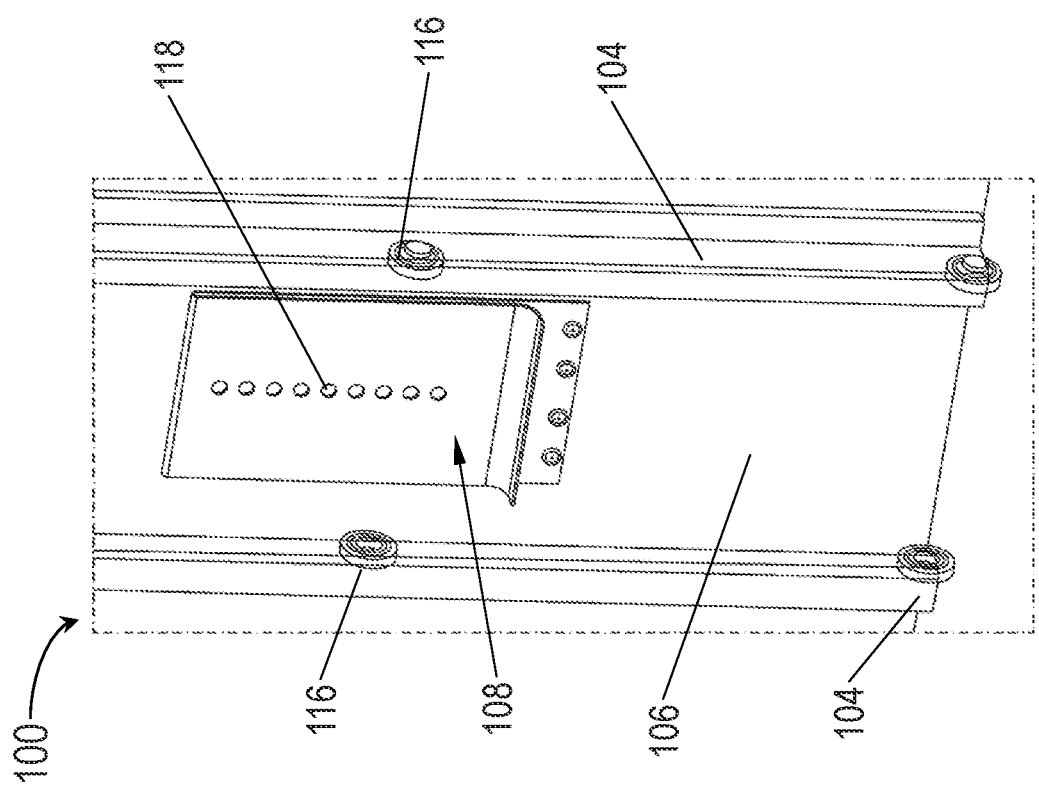
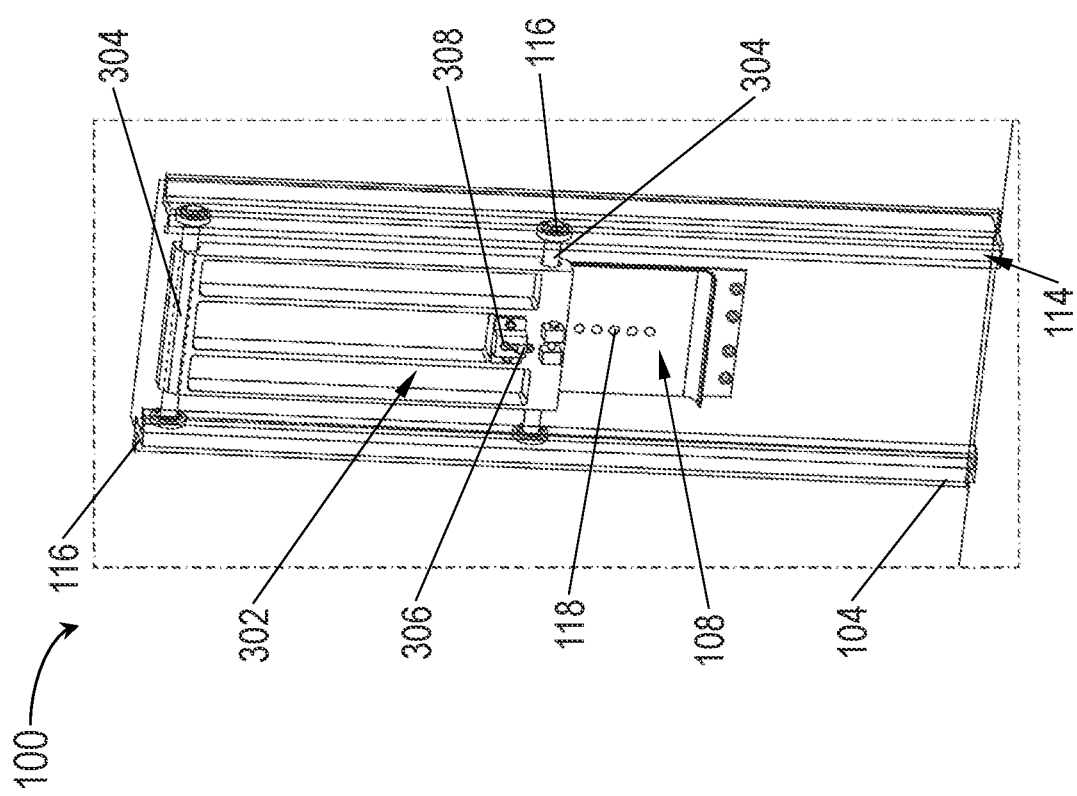
FIG. 3A
FIG. 3B

AIRCRAFT SEAT WITH ENERGY ATTENUATING METERING PLATE

BACKGROUND

Conventional rotorcraft/aircraft seats may be height-adjustable, e.g., to a desired height above the cabin floor to accommodate taller or shorter occupants. Further, conventional rotorcraft seats must incorporate energy attenuation (EA) mechanisms to provide a controlled deceleration along a stroking distance that absorbs and dissipates downward force (e.g., via controlled component deformation) in the event of a crash or other like impact event. However, conventional seats need two separate sliding mechanisms to accomplish these diverse goals: one to control vertical adjustment of the seat, and one to control energy attenuation. The need for two separate mechanisms adds complexity and weight to the seat assembly and may limit the available EA stroking distance.

SUMMARY

In a first aspect, a seat base assembly for an aircraft seat is disclosed. In embodiments, the aircraft seat assembly includes parallel rails attached to an aircraft bulkhead and a sled to which the aircraft seat (seatback and seat frame/seat cushion) may be attached. The sled translates vertically relative to the bulkhead via sliding members attached to the sled which slidably translate along slots set into the rails. A metering plate is attached behind the sled to the bulkhead and includes metering holes for adjusting the height of the aircraft seat. For example, by securing a locking pin through a hole in the sled and a metering hole in the metering plate, the seat occupant may adjust the aircraft seat to one of a series of desired heights. The metering plate is folded over into forward and rear layers (the forward layer including the metering holes) such that in an impact event, the metering plate deforms to absorb energy and control downward deceleration of the aircraft seat.

In some embodiments, the metering plate is attached to the bulkhead via a seat base to which the metering plate is attached near its lower end.

In some embodiments, the sled includes pairs of sliding members connected by an axle extending through the sled, each pair of sliding members including left-side and right-side members configured for slidable translation through a respective left-side or right-side slot respectively set into a left-side or right-side rail.

In some embodiments, the metering plate includes stabilizer bolts set into the rear layer and capable of stabilizing a gap between forward and rear layers of the metering plate at a consistent width (e.g., such that the forward and rear layers are substantially parallel).

In a further aspect, an aircraft seat assembly for a rotorcraft or like aircraft is disclosed. In embodiments, the aircraft seat assembly includes an aircraft seat, e.g., a seatback and seat frame/seat cushion capable of supporting a seat occupant, e.g., a passenger, crewmember, or pilot of the aircraft. The aircraft seat assembly includes parallel rails attached to an aircraft bulkhead and a sled to which the aircraft seat (seatback and seat frame/seat cushion) may be attached. The sled translates vertically relative to the bulkhead via sliding members attached to the sled which slidably translate along slots set into the rails. A metering plate is attached behind the sled to the bulkhead and includes metering holes for adjusting the height of the aircraft seat. For example, by securing a locking pin through a hole in the sled and a metering hole in the metering plate, the seat occupant may adjust the aircraft seat to one of a series of desired heights. The metering plate is folded over into forward and rear layers (the forward layer including the metering holes) such that in an impact event, the metering plate deforms to absorb energy and control downward deceleration of the aircraft seat.

In some embodiments, the metering plate is attached to the bulkhead via a seat base to which the metering plate is attached near its lower end.

In some embodiments, the sled includes pairs of sliding members connected by an axle extending through the sled, each pair of sliding members including left-side and right-side members configured for slidable translation through a respective left-side or right-side slot respectively set into a left-side or right-side rail.

In some embodiments, the metering plate includes stabilizer bolts set into the rear layer and capable of stabilizing a gap between forward and rear layers of the metering plate at a consistent width (e.g., such that the forward and rear layers are substantially parallel).

In some embodiments, the locking pin is spring-loaded to remain in a default configuration wherein the locking pin is held in the sled hole and metering hole corresponding to the current height of the aircraft seat. For example, the seat occupant may articulate a handle to release the locking pin and thereby adjust the aircraft seat to a new desired height, releasing the handle to restore the locking pin through the sled hold and selected metering hole.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A and 3B respectively illustrate a seat base of the aircraft seat assembly of FIG. 1, and the EA metering plate of FIG. 1, in a nominal state;

DETAILED DESCRIPTION

Figure 1:
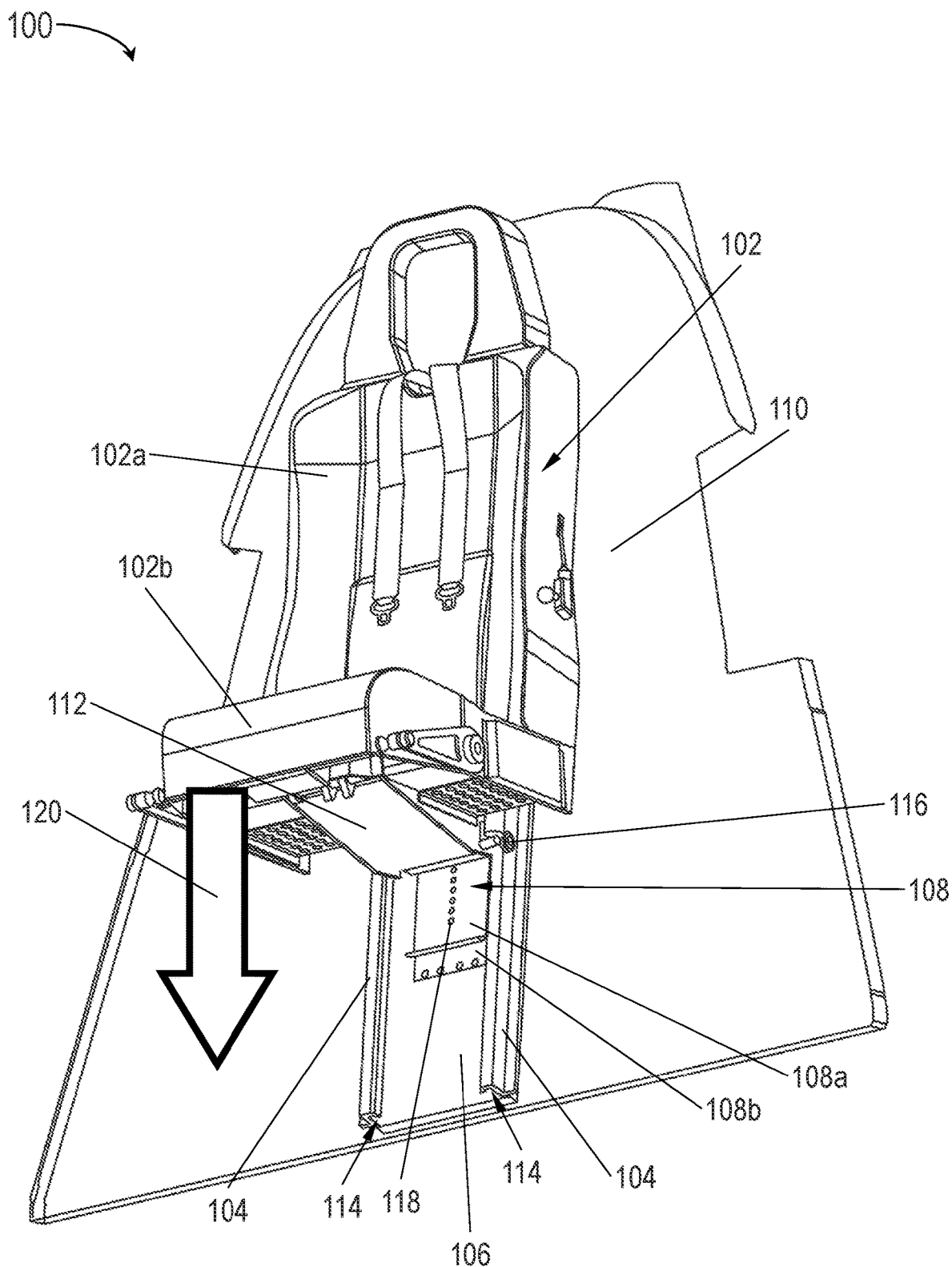
FIG. 1 is an underside isometric view of an aircraft seat assembly including an energy attenuating (EA) metering plate according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a seat assembly for a rotorcraft or other aircraft that integrates into a single component a metering plate for seat height adjustment and a deformable energy attenuation (EA) component. Integrating these two diverse systems into a single component reduces weight and complexity; further, the available EA stroking distance may be increased due to the lack of space conflict from a second sliding mechanism.

Referring now to FIG. 1, an aircraft seat assembly 100 is shown. The aircraft seat assembly may include an aircraft seat 102, seat base rails 104, seat base 106, and energy attenuation (EA) metering plate 108.

In embodiments, the aircraft seat 102 may attach to an aircraft bulkhead 110 via a seat base assembly including the seat base rails 104, seat base 106, and a sled (302, FIG. 3A). For example, the aircraft bulkhead 110 may be vertical or substantially vertical (e.g., at an angle of no more than 15 degrees from vertical). In embodiments, the seat base rails 104 may be fixed to the seat base 106 and extend in parallel along the bulkhead 110. For example, the seat base rails 104 may include a left-side and a right-side rail 104 fixed to the seat base 106 with a space between them; similarly, the seat base 106 may be a substantially tubular structure fixed to the bulkhead 110.

The aircraft seat 102 may comprise a seatback 102a and seat cushion/seat frame 102b collectively supporting an occupant of the seat, e.g., a pilot, crewmember, or passenger. For example, the seatback 102a and seat cushion/seat frame 102b may be separate components or may be combined in a single component. In embodiments, the aircraft seat 102 may attach to the seat base assembly via the sled. For example, the aircraft seat 102 may be supported by a support structure 112 underneath the seat frame/seat cushion 102b, the support structure fixed to the sled.

In embodiments, the left-side and right-side rails 104 may each include a slot 114 extending fully or partially along the length of each rail, the left-side and right-side slots facing each other across the space separating the rails such that the left-side and right-side slots also extend in parallel. For example, each slot 114 may be capable of accepting a sliding member 116.

In embodiments, the sled may include one or more pairs of sliding members 116, each pair of sliding members translating along the left-side and right-side slots 114. For example, each pair of sliding members 116 may be connected by an axle (304, FIG. 3A) or like structure extending through the sled. In embodiments, the sled, and thereby the aircraft seat 102, may translate up or down relative to the left-side and right-side rails 104.

In embodiments, the EA metering plate 108 may be attached to the seat base 106 between the left-side and right-side rails 104 and behind the sled. For example, the EA metering plate 108 may provide for vertical adjustment of the aircraft seat 102 (e.g., relative to the cabin floor) by the occupant of the seat, and may also provide for EA stroking in the event of a crash or like impact event. The EA metering plate 108 may include a vertically spaced sequence of holes 118, each hole corresponding to a desired height of the aircraft seat 102. For example, the sled may include a hole (not shown) extending through the sled and capable of accommodating a locking pin (306, FIG. 3A; "pop pin").

In embodiments, the EA metering plate 108 may also provide energy attenuation in the event of a crash or like impact event. For example, in the event of a crash wherein the aircraft seat 102 and its occupant is subject to rapid downward deceleration (e.g., substantially parallel to the z-axis and/or the spine of the occupant) and a potentially injurious or even fatal load. In embodiments, the EA metering plate 108 may be fixed to the seat base 106; for example, the EA metering plate 108 may include a forward layer 108a and a rear layer 108b. In some embodiments, the EA metering plate 108 may be attached to the seat base 106 near the lower end of the rear layer 108b, and a portion of the forward layer 108a may extend forward under the support structure 112.

In embodiments, in response to a crash event wherein the aircraft seat 102 is rapidly driven downward (120; e.g., relative to the bulkhead 110) by a crash load, the EA metering plate 108 may at least partially absorb the crash load via controlled deformation, slowing the downward deceleration of the aircraft seat.

Figure 2:
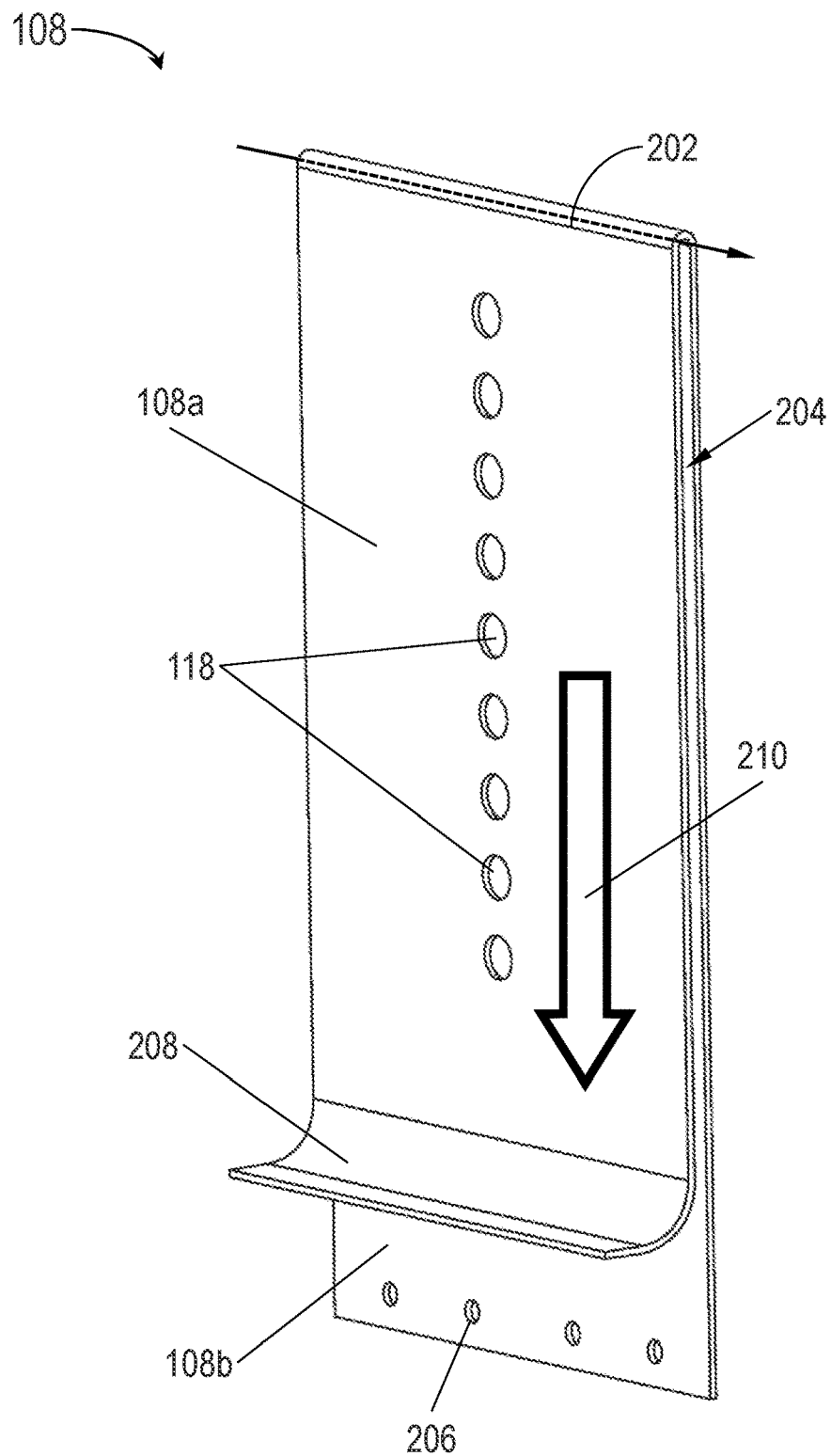
FIG. 2 is an isometric view of the EA metering plate of FIG. 1.

Referring now to FIG. 2, the EA metering plate 108 is shown.

In embodiments, the EA metering plate 108 may be a steel plate folded (e.g., bent) into the forward layer 108a and the rear layer 108b relative to a lateral axis 202 such that a gap 204 remains between the forward and rear layers. For example, the gap 204 may be an air gap of substantially uniform width. As shown by FIG. 1, the EA metering plate 108 may be fixed to the seat base (106, FIG. 1) via bolt holes 206 near the lower end of the rear layer 108b.

In embodiments, the forward layer 108a of the EA metering plate 108 may include a vertical sequence of holes 118. For example, the holes 118 may extend through the forward layer 108a into the gap 204, but not into the rear layer 108b. Each hole 118 may correspond to a height of the aircraft seat (102, FIG. 1), such that an occupant of the aircraft seat may adjust the aircraft seat to a desired height by releasing the locking pin (306, FIG. 3A) and re-inserting the locking pin through the hole (308, FIG. 3A) in the sled (302, FIG. 3A) as well as the hole 118 corresponding to the desired height, thereby securing the aircraft seat to the desired height.

In embodiments, the forward layer 108a may include a portion 208 extending forward from the forward layer and under the support structure (112, FIG. 1). For example, in response to a crash event, the downward deceleration of the sled (302, FIG. 3) (and of the support structure 112 and aircraft seat 102 attached thereto) may be attenuated by the portion 208 as the EA metering plate 108 deforms. In embodiments, controlled deformation of the EA metering plate 108 may drive the forward layer 108a downward (210) relative to the rear layer 108b.

In some embodiments, e.g., as shown below by FIGS. 4A and 4B, the width of the forward layer 108a and/or the rear layer 108b of the EA metering plate 108 may taper between the lateral axis 202 and the portion 208.

Referring to FIGS. 3A and 3B, the aircraft seat assembly 100 is shown.

In embodiments, referring in particular to FIG. 3A, the sled 302 may be fixed to the aircraft seat (102, FIG. 1) and may translate (e.g., in a substantially vertical direction) along the slots 114 set into the seat base rails 104 via sliding members 116. For example, the sled 302 may incorporate one or more pairs of sliding members 116 such that each pair of sliding members is set on either side of an axle 304 extending through the sled, the sliding members providing a path for vertical height adjustment of the aircraft seat 102 as well as a path for energy attenuation in response to a crash event.

In embodiments, the locking pin 306 may be inserted through the hole 308 in the sled 302 and through a hole 118 in the EA metering plate 108 to secure the aircraft seat 102 at the height corresponding to the selected hole 118. For example, the locking pin 306 may be held by one or more springs in the hole through the sled 302, and the selected hole 118 in the EA metering plate 108, into which the locking pin has been inserted. In embodiments, to adjust the aircraft seat 102 to a new height, the locking pin 306 may be attached to a lever or handle controllable by the occupant of the aircraft seat. For example, the occupant may release the locking pin 306 from the sled hole 308 and the selected hole 118, actuate the aircraft seat 102 to a new desired height (e.g., by adjusting their weight in the aircraft seat), and re-secure the aircraft seat at the new desired height by re-inserting the locking pin through the hole 308 in the sled 302 and the hole 118 in the EA metering plate 108 corresponding to the new desired height. In some embodiments, the aircraft seat 102 may be spring-loaded and/or counterbalanced to default to a maximum height, e.g., until pushed downward and secured to a lower height by the occupant. For example, if the occupant desires a greater height it would not be necessary to lift the aircraft seat 102 to said greater height, merely to release the locking pin 306 and allow the aircraft seat to rise until the new desired height is reached.

Referring in particular to FIG. 3B, the EA metering plate 108 may be attached to the seat base (106, FIG. 1) behind the sled 302.

Figure 4B:
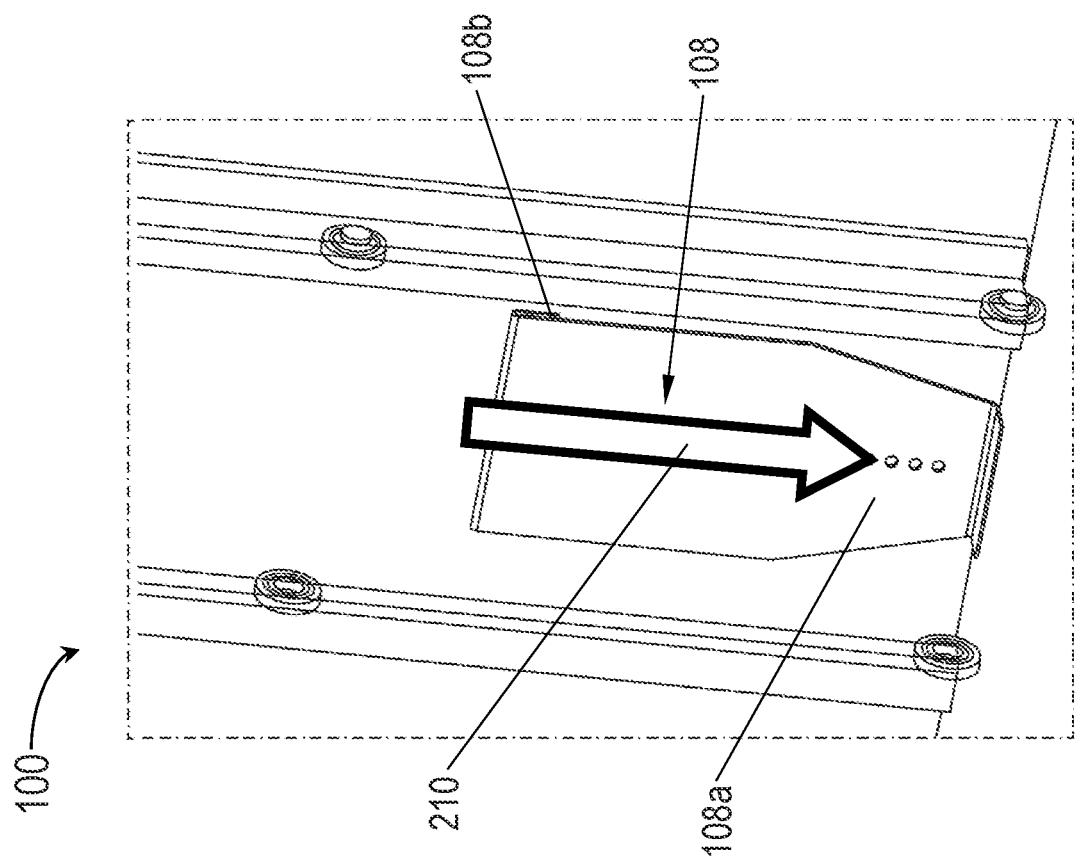
FIGS. 4A and 4B respectively illustrate the seat base of FIG. 3A, and the EA metering plate of FIG. 3B, in a deformed state.
Figure 4A:
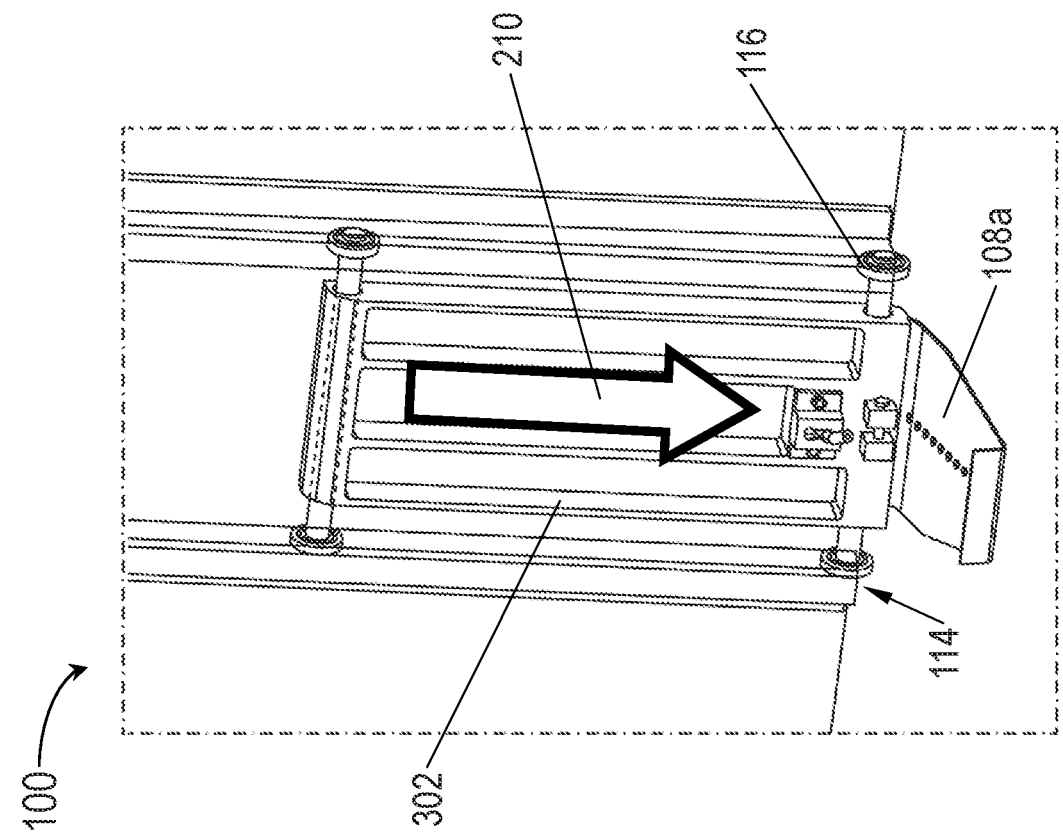

Referring now to FIGS. 4A and 4B, the aircraft seat assembly 100 is shown.

In response to a crash event, the sled 302 attached to the aircraft seat (102, FIG. 1) may be driven downward (210) in a rapid deceleration by a crash load (e.g., via the sliding members 116 through the slots 114). In embodiments, the EA metering plate 108 may absorb at least a portion of this crash load via controlled deformation. For example, the forward layer 108a of the EA metering plate 108 may be driven downward (210) relative to the rear layer 108b, absorbing the crash load and controlling the downward deceleration of the aircraft seat 102.

Figure 5B:
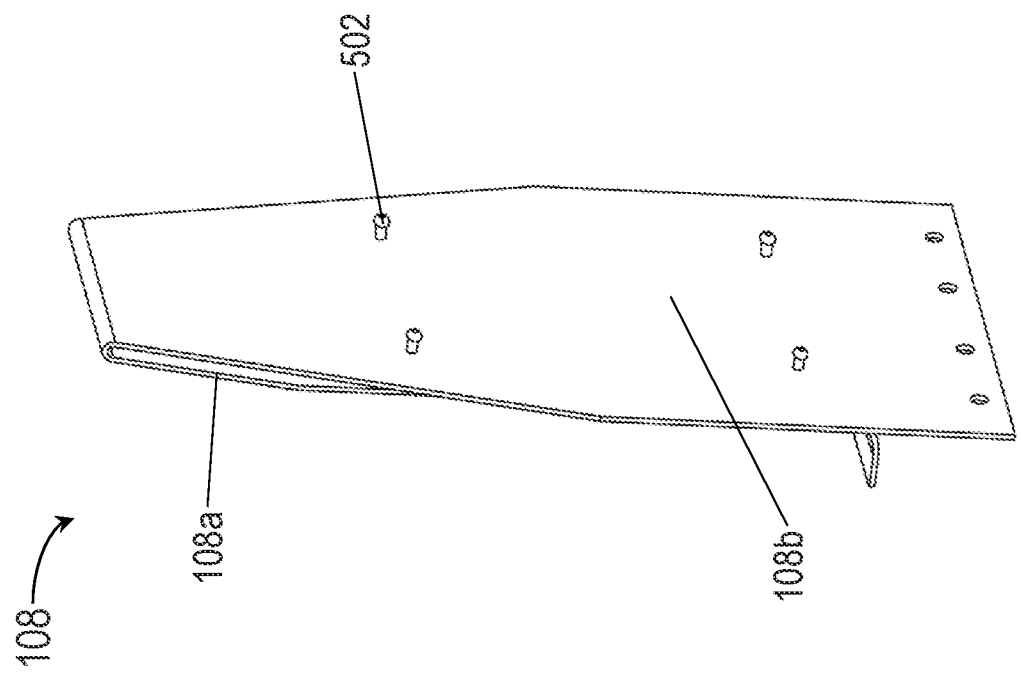
FIGS. 5A and 5B are respectively side and rear isometric views of an EA metering plate including internal stabilizers according to example embodiments of the inventive concepts disclosed herein.
Figure 5A:
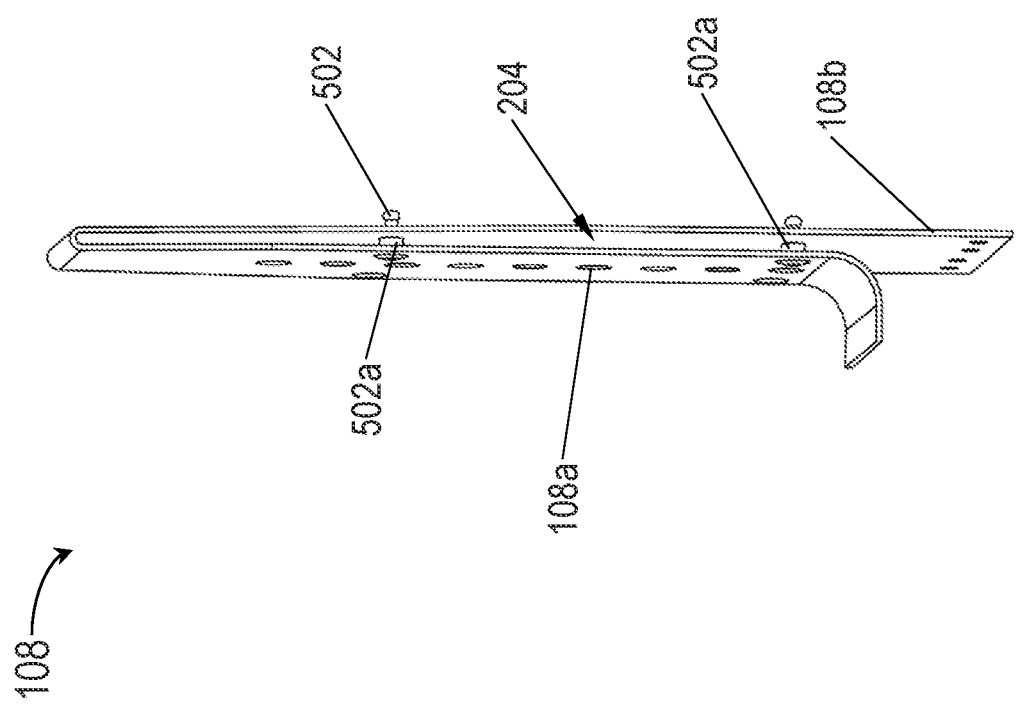

Referring now to FIGS. 5A and 5B, the EA metering plate 108 is shown.

In embodiments, the EA metering plate 108 may include stabilizer bolts 502 for maintaining the gap 204 between the forward layer 108a and rear layer 108b. For example, the forward layer 108a and/or rear layer 108b may include additional bolt holes through which stabilizer bolts 502 may be driven. In some embodiments, the stabilizer bolts 502 may include a portion 502a set between the forward and rear layers 108a, 108b; similarly, in some embodiments, the forward and rear layers 108a, 108b may be stabilized by structures disposed solely between the forward and rear layers. In some embodiments, the stabilizer bolts 502 may be sheared away by the deformation of the EA metering plate 108 (e.g., as shown by FIGS. 4A and 4B).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A seat base assembly for an aircraft seat, comprising:
two parallel rails attachable to a bulkhead of an aircraft via a seat base,
each rail including a slot set thereinto and extending along the rail in a downward direction;
a sled attachable to an aircraft seat,
the sled disposed between the two rails and slidably attached to each rail via one or more sliding members configured to translate along the slot,
the sled having a first hole set thereinto and extending through the sled;
a metering plate disposed between the seat base and the sled, the metering plate folded into a forward layer and a rear layer along a lateral axis,
the forward layer and the rear layer substantially mutually parallel and separated by a gap,
the forward layer including a substantially vertical array of second holes set thereinto,
each second hole extending through the forward layer into the gap and associated with a height of the aircraft seat,
the metering plate configured to deform in the downward direction in response to an impact event; and
a locking pin controllable by an occupant of the aircraft seat, the locking pin configured for insertion through the first hole and a second hole to secure the aircraft seat at the height associated with the second hole.

2. The seat base assembly of claim 1, wherein the metering plate is attached to the seat base at or near a lower end of the metering plate.

3. The seat base assembly of claim 1, wherein:
the two parallel rails include a left-side rail having a left-side slot and a right-side rail having a right-side slot; and
the one or more sliding members include at least one pair of sliding members comprising a left-side sliding member and a right-side sliding member connected by an axle, the left-side sliding member configured for translation along the left-side slot and the right-side sliding member configured for translation along the right-side slot.

4. The seat base assembly of claim 1, further comprising:
a plurality of third holes set into the rear layer of the metering plate, each third hole capable of accepting a bolt, the metering plate attached to the seat base at least in part via the plurality of bolts,
each bolt including a stabilizing portion configured to extend through the gap between the forward and rear layers to stabilize the forward and rear layers in the substantially parallel state.

5. An aircraft seat assembly, comprising:
an aircraft seat configured to support an occupant;
a seat base assembly, comprising:
two parallel rails attachable to a bulkhead of an aircraft via a seat base,
each rail including a slot set thereinto and extending along the rail in a downward direction;
a sled attachable to the aircraft seat,
the sled disposed between the two rails and slidably attached to each rail via one or more sliding members configured to translate along the slot,
the sled having a first hole set thereinto and extending through the sled;
a metering plate disposed between the seat base and the sled, the metering plate folded into a forward layer and a rear layer along a lateral axis,
the forward layer and the rear layer separated by a gap,
the forward layer including a substantially vertical array of second holes set thereinto,
each second hole extending through the forward layer into the gap and associated with a height of the aircraft seat,
the metering plate configured to deform in the downward direction in response to an impact event; and
a locking pin controllable by the occupant, the locking pin configured for insertion through the first hole and a second hole to secure the aircraft seat at the height associated with the second hole.

6. The aircraft seat assembly of claim 5, wherein the metering plate is attached to the seat base at or near a lower end of the metering plate.

7. The aircraft seat assembly of claim 5, wherein:
the two parallel rails include a left-side rail having a left-side slot and a right-side rail having a right-side slot; and
the one or more sliding members include at least one pair of sliding members comprising a left-side sliding member and a right-side sliding member connected by an axle, the left-side sliding member configured for translation along the left-side slot and the right-side sliding member configured for translation along the right-side slot.

8. The aircraft seat assembly of claim 5, further comprising:
a plurality of third holes set into the rear layer of the metering plate, each third hole capable of accepting a bolt, the metering plate attached to the seat base at least in part via the a plurality of bolts,
each bolt including a stabilizing portion configured to extend through the gap between the forward and rear layers to stabilize the forward and rear layers in the substantially parallel state.

9. The aircraft seat assembly of claim 5, wherein:
the locking pin is held in a default configuration by at least one spring, the default configuration associated with insertion through the first hole and a second hole of the array of second holes; and
wherein the locking pin is operatively coupled to a handle controllable by the occupant, the handle articulable to release the locking pin from the default configuration.

* * * * *